United States Patent [19]

Koike

[11] Patent Number: 4,650,313
[45] Date of Patent: Mar. 17, 1987

[54] DUPLEX COPYING METHOD
[75] Inventor: Tadao Koike, Tokyo, Japan
[73] Assignee: Ricoh Company, Ltd., Tokyo, Japan
[21] Appl. No.: 781,515
[22] Filed: Sep. 30, 1985
[30] Foreign Application Priority Data
  Oct. 2, 1984 [JP] Japan .................................. 59-206807
[51] Int. Cl.$^4$ ............................................ G03G 21/00
[52] U.S. Cl. .................................. 355/3 SH; 355/23; 355/26; 355/77
[58] Field of Search .................. 355/3 SH, 23, 24, 26, 355/14 SH, 77

[56] References Cited
U.S. PATENT DOCUMENTS

| 4,125,325 | 11/1978 | Batchelor et al. | 355/26 |
| 4,330,197 | 5/1982 | Smith et al. | 355/23 X |
| 4,362,379 | 12/1982 | Tiek et al. | 355/23 |

Primary Examiner—R. L. Moses
Attorney, Agent, or Firm—Oblon, Fisher, Spivak, McClelland & Maier

[57] ABSTRACT

A duplex copying method of making duplex copies from one-side originals, using an electrophotographic duplex copying machine provided with an ADF and an original detection means capable of detecting the presence or absence of original document in an original input tray of the ADF, and a means for detecting whether copying is performed on a front, odd-numbered side of a transfer sheet or a back, even-numbered side of a transfer sheet, and a sheet transportation change-over means for changing the transportation so as to discharge a one-side copy sheet, with the image side down, onto a copy sheet output tray, without transporting the copy sheet to the stations for forming images on the back side thereof, when it is detected that there is no original in the original input tray of the ADF during the detection of the front side copying in a one-side original - duplex copy mode.

2 Claims, 7 Drawing Figures

DUPLEX COPYING METHOD

BACKGROUND OF THE INVENTION

The present invention relates to a duplex copying method of making duplex copies from one side originals, using an electrophotographic duplex copying machine provided with an auto document feeder.

Conventional electrophotographic duplex copying machines are provided with an auto document feeder (hereinafter referred to as ADF) or a recycling auto document feeder (hereinafter referred to as RADF), which is mounted on a contact glass, a duplex copy tray and a transfer sheet inverting apparatus, and are capable of performing (i) a one-side original—duplex copy mode of making a duplex copy from two originals, each original bearing images on one side thereof only (hereinafter referred to one-side original), or (ii) a duplex original—duplex copy mode of making a duplex copy from a duplex original which bears images on both sides.

The basic operation of the one-side original—duplex copy mode comprises the steps of successively feeding one-side originals, which are stacked in the order of the pages with the respective image side down on an original input tray, onto a contact glass in the order of the pages by an ADF or by a RADF, transporting a transfer sheet to an image transfer station, thereby making a copy which bears the image copied from a first, odd-numbered original at an image transfer station, temporarily holding the corresponding odd-numbered image bearing transfer sheet in a duplex copy tray, feeding again the transfer sheet from the duplex copy tray to the image transfer section, transferring the image corresponding to the image of the next even-numbered original to the back side of the transfer sheet to make a duplex copy, and discharging the duplex copy with the odd-numbered image side down onto a copy sheet output tray, whereby duplex copies are stacked on the copy sheet output tray in the order of the pages, for instance, with the first page down, the second page up, the third page down, and the fourth page up, so forth.

In the above one-side original—duplex copy mode, when the total number of one-side originals is an odd number, it is always a problem how to perform the copying operation of the last original. More specifically, when the total number is an odd number, it is necessary to discharge a one-side copy sheet which bears only at the first side the image corresponding to the image of the last original, with the image side down, onto the copy sheet output tray, in the order of the pages.

For instance, in a conventional electrophotographic copying machine with an ADF apparatus, the copying operation is performed in the same way, regardless of whether the total number of one side originals is an even number or an odd number. For instance, when the total number is an odd number, the transfer sheet which bears the image corresponding to the original image (hereinafter referred to as the one-side copy sheet) is temporarily held in a duplex copy sheet tray and upon detection of a signal indicating that there remains no more original in an original input tray, the one-side copy sheet is fed from the duplex copy sheet tray again to the image transfer station, then transferred to the image fixing station, without image transfer and image fixing, and is finally discharged to the copy sheet output tray. In other words, in the above, the copying process is performed as if there was a blank original after the last odd-numbered original, so that the last copy sheet is uselessly caused to pass through the image transfer station and the image fixing station. The last copy sheet transportation process, which should be omitted if possible, will obviously increase the opportunity of copy sheet jamming.

Furthermore, for working out this problem, there is proposed in Japanese Laid-Open Patent Application No. 59-74574 an electrophotographic copying machine provided with a RADF. In this electrophotographic copying machine, prior to copying operation, it is determined whether or not the total number of one-side originals is an odd number by setting the originals in the RADF and counting the number by the RADF. When the total number is an odd number, the unnecessary transportation of the last one-side copy sheet, for instance, through the image transfer station and the image fixing station, is skipped. For this process, however, an expensive RADF apparatus is necessary and it is always necessary to count the total number of one-side originals to be copied prior to the copying thereof.

SUMMARY OF THE INVENTION

It is therefore an object of the present invention to provide a duplex copying method of making duplex copies from one-side originals, using an electrophotographic duplex copying machine provided with an ADF, capable of skipping the unnecessary transfer sheet transportation, for instance, through the image transfer station and the image fixing station, when copying the last one-side original is an odd-numbered original, without counting the total number of one-side originals to be copied before they are copied, thereby reducing the opportunity of the copy sheets being jammed during the above transportation, and also capable of stacking the copies in the order of the pages.

According to the present invention, the above object is achieved by a duplex copying method, using an original detection means disposed in the ADF, capable of detecting the presence or absence of original document in an original input tray of the ADF, and a means for detecting whether copying is performed on a front, odd-numbered side of a transfer sheet or a back, even-numbered side of a transfer sheet, and a sheet transportation change-over means for changing the transportation so as to discharge a one-side copy sheet, with the image side down, onto a copy sheet output tray, without transporting the copy sheet to the stations for forming images on the back side thereof, when it is detected that there is no original in the original input tray of the ADF during the detection of the front side copying in a one-side original - duplex copy mode.

DETAILED DESCRIPTION OF THE PREFERRED EMBODIMENTS

Figure 1:
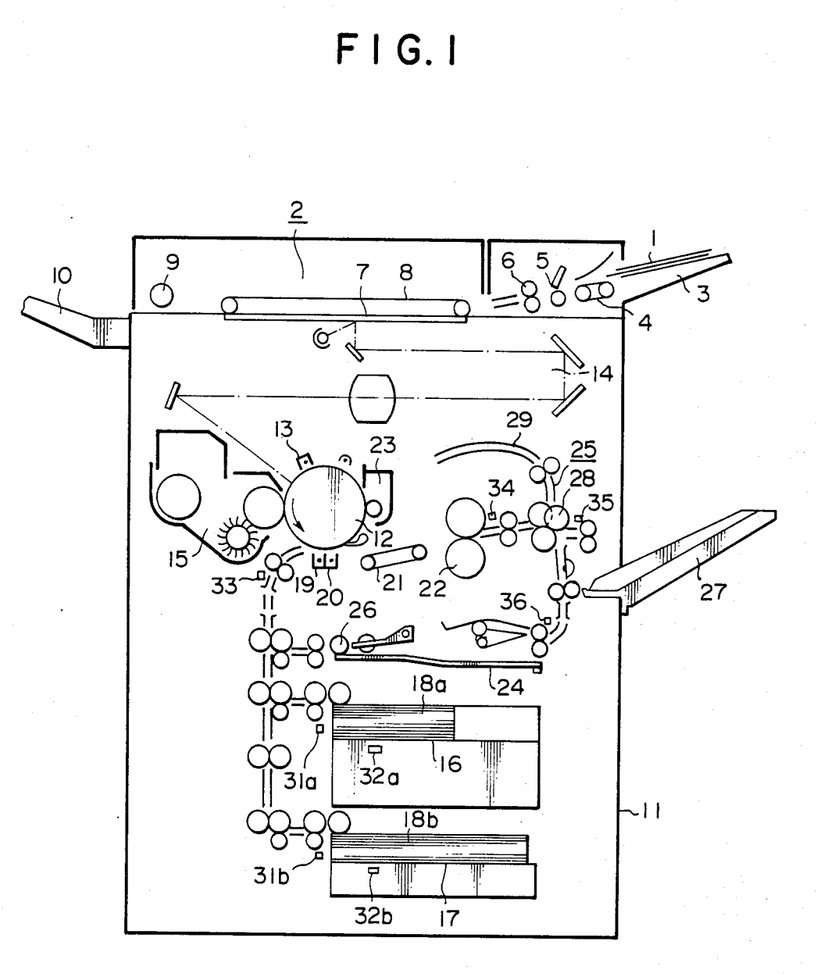
FIG. 1 is a schematic illustration of an electrophotographic duplex copying machine for use in the present invention.
Figure 2:
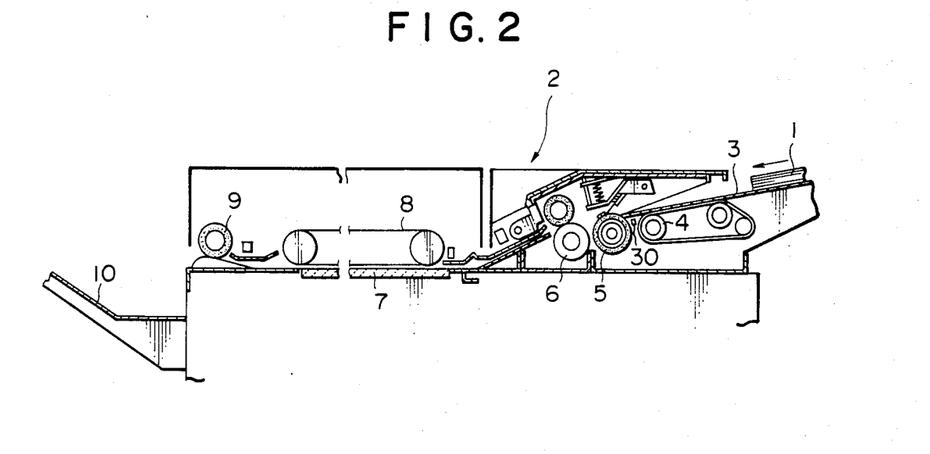
FIG. 2 is a schematic illustration of an auto document feeder which is attached to the electrophotographic duplex copying machine shown in FIG. 1.

By referring to FIG. 1 and FIG. 2, the basic copying operation of a one-side original - duplex copy mode will now be explained.

In this copy mode, one-side originals 1 are stacked on an original input tray 3 of an ADF (auto document feeder) 2 (refer to FIG. 2) with each image side down in the order of the pages from the bottom of the original input tray 3.

When copying operation is initiated, the one-side originals 1 are individually and intermittently transported towards an original sheet separation section 5, with the lowermost original first, followed by several overlaying originals, by an original feeding device 4. At the original sheet separation section 5, the lowermost original 1 is separated from the other originals and is then transported towards a contact glass 7 by a pair of original input rollers 6. The original 1 is transported onto the contact glass 7 by a transportation belt 8 and is then stopped at a predetermined position on the contact glass 7, so that copying operation is performed. The original 1 is then discharged onto an original output tray 10 by the transportation belt 8 and an original output roller 9.

Within the main body of an electrophotographic duplex copying machine 11, there is disposed a photoconductor drum 12. The outer surface of the photoconductor drum 12 is uniformly charged by an electric charger 13 in the dark and is then exposed to the optical image of the one-side original 1 by an optical system 14, so that a latent electrostatic image corresponding to the optical image is formed on the photoconductor drum 12.

The latent electrostatic image is then developed to a visible toner image by a development apparatus 15. The thus formed toner image is then transferred onto a transfer sheet 18a or 18b by an image transfer charger 19, which transfer sheet 18a or 18b is selectively fed onto the toner-image-bearing surface of the photoconductor drum 12, either from a first transfer sheet feeding tray 16 or from a second transfer sheet feeding tray 17. In FIG. 1, reference numeral 18a indicates transfer sheets of a first size stacked in the first transfer sheet feeding tray 16 and reference numeral 18b indicates transfer sheets of a second size stacked in the second transfer sheet feeding tray 17. However, for the convenience of explanation, those transfer sheets are collectively called transfer sheet 18 or transfer sheets 18.

The toner-image-bearing transfer sheet 18 is then separated from the photoconductor drum 12 by a sheet separation charger 20 and transported to an image fixing apparatus 22 by a transportation belt 21, where the toner image is fixed to the transfer sheet 18.

The toner remaining on the photoconductor drum 12 after the above image transfer is removed by a cleaning apparatus 23.

Thus, the image of the one-side original 1 is copied on the front or first side of the transfer sheet 18. In the above copying operation, the first page of the one-side originals 1 is copied on the front (or first) side of the transfer sheet 18. Generally, this can be applied to any case where the odd-numbered pages of the one-side originals 1 are copied on the front side of each transfer sheet 18.

In order to perform copying on the back side of the transfer sheet 18 which already has the copy image on the front side thereof is then transported to a duplex copy tray 24. During the transportation of the transfer sheet 18 towards the duplex copy tray 24, the transfer sheet 18 is inverted by a transfer sheet inversion apparatus 25 which is disposed downstream of the image fixing apparatus 22, so that the transfer sheet 18 is placed with the front face up in the duplex tray 24.

The transfer sheet 18 is then discharged from the duplex tray 24 by a sheet feeding roller 26 and fed onto the photoconductor drum 12. At this moment, the second one-side original 1 is set at the predetermined position on the contact glass 7 and the toner image corresponding to the image of the second one-side original 1 is formed on the photoconductor drum 12. As a matter of course, this step can be applied to any case where one-side originals having an even number page next to the respective previous one-side originals having an odd-number pages are copied.

The original image of the second one-side original 1 or of the original sheet having an even numbered page is then copied on the back side of the transfer sheet 18 and transferred to the image fixing apparatus 22, so that duplex copying is finished. The thus formed duplex copied transfer sheet 18 is discharged onto a copy sheet output tray 27, without being inverted by the transfer sheet inversion apparatus 25. As a result, the transfer sheets are stacked on the copy sheet output tray 27 with each front image side corresponding to the original image of each odd-numbered page bearing original down and with each back image side corresponding to the original image of each even-numbered page bearing original up in the order of the sequential pages.

The transfer sheet inversion apparatus 25 comprises triple rollers 28 for changing over the transportation direction of the transfer sheets and a sheet inversion path 29, for example, as disclosed in detail in Japanese Utility Model Application No. 58-92246. The transfer sheet is caused to enter the sheet inversion path 29, so that the transfer sheet is inverted.

In the one-side original - duplex copy mode, when the total number of the one-side originals 1 is an even number, the above-described operation is repeated until the last one-side original 1 is copied.

Figure 3A:
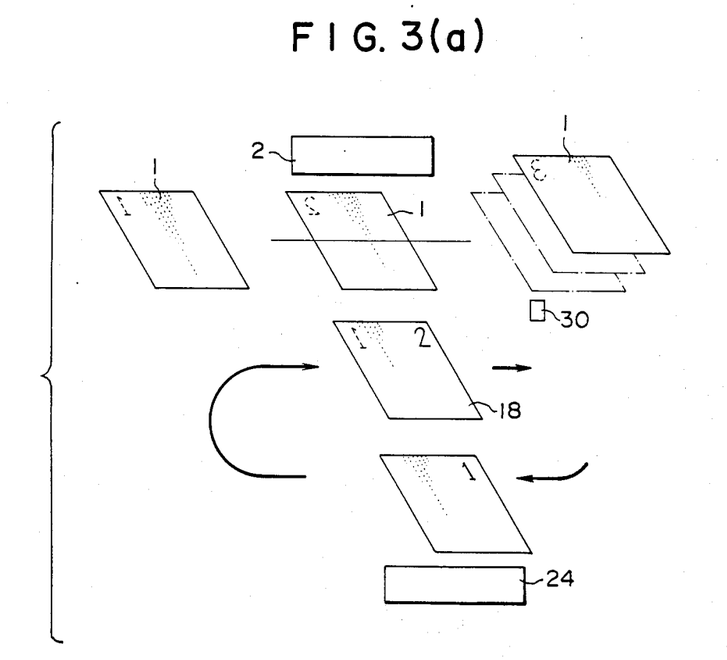
FIGS. 3(a) and 3(b) are schematic illustrations in explanation of the flow of one-side originals and the corresponding duplex copies in the electrophotographic duplex copying machine.
Figure 3B:
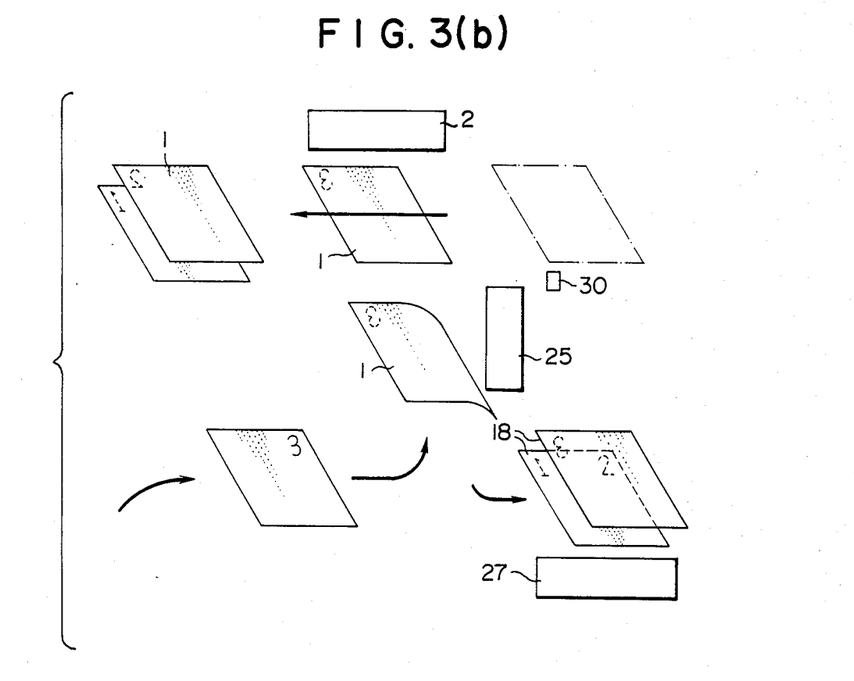

The duplex copying operation at the time the total number of the one-side originals 1 is an odd number will now be explained by referring to FIG. 3(a) and FIG. 3(b).

Just for explanation, it is supposed that there are three one-side originals 1 for duplex copying. At the sheet feeding portion of the previously mentioned ADF 2, there is disposed an original detection sensor 30 as shown in FIG. 2. In this case, the first two one-side originals 1 are duplex-copied in the same manner as described above, which is illustrated in FIG. 3(a). When the last third one-side original 1 is transported onto the contact glass 7, there is no more one-side original 1 left on the original input tray 3, so that an original absence signal indicating this is generated and input to a sequence control section 503 which will be explained in detail later by referring to FIG. 4. When such original absence signal is input to the sequence control section 503 and the front side copying of the transfer sheet 18 for the third one-side original 1 is being carried out, so that a signal indicating that the front side copying of the transfer sheet 18 for the third one-side original 1 being carried out is generated, the one-side original 1 is determined to be the last, odd-numbered one-side original.

When the one-side original 1 is determined to the last, odd-numbered original 1, front-side copying is carried out on the transfer sheet 18 and the toner image is fixed to the transfer sheet 18 by the image fixing apparatus 22 in an ordinary manner, but in this case, after the image fixing, the transfer sheet 18 is inverted by the transfer sheet inversion apparatus 25 and is then directly discharged onto the copy sheet output tray 27, without being transported to the duplex tray 24. Since the transfer sheet 18 is inverted by the transfer sheet inversion apparatus 25, the transfer sheet is discharged, with the image side down, onto the copy sheet output tray 27. As a result, all the transfer sheets 18 are stacked on the copy sheet output tray 27, with the odd-numbered sides down and the even-numbered sides up, in the order of the pages.

In the present invention, the last, odd-numbered original is copied in the above-described manner without counting the total number of one-side originals to be copied prior to the copying operation.

In the above embodiment, when an original absence signal is detected during the front side copying of a one-side original, the one-side original is determined to be the last, odd-numbered original. However, the timing of the original absence signal is not limited to the duration of the front side copying of a one-side original, but it can be detected at any time prior to the transportation of the transfer sheet 18 to the transfer sheet inversion apparatus 25.

In the present invention, by detecting both (i) the absence of one-side original on the original input tray 3 of the ADF 2 and (ii) the front side copying of a transfer sheet, the one-side original which is to be copied at the front side of a transfer sheet is determined to be the last, odd-numbered one-side original. This determination is one of the most essential key features in the duplex copying method according to the present invention.

Figure 4:
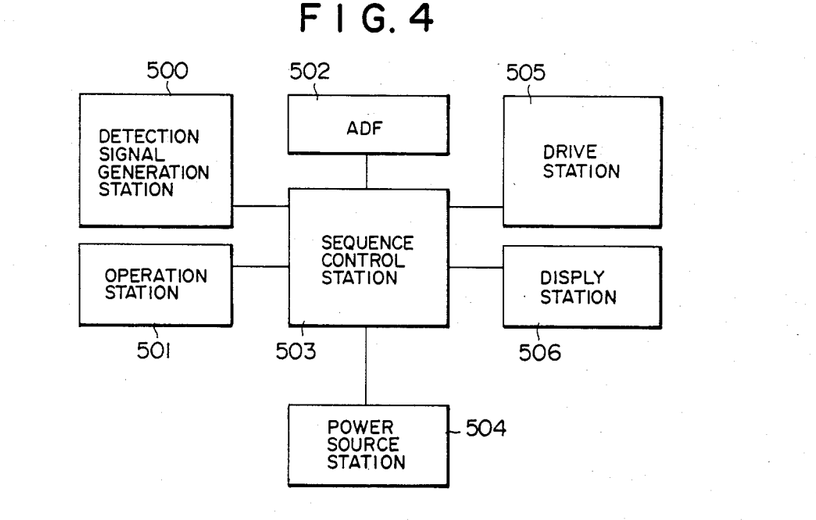
FIG. 4 is a block diagram in explanation of the overall duplex copying operation according to the present invention.

By referring to FIG. 4, the overall operation of the duplex copying method according to the present invention will now be explained.

In this figure, reference numeral 500 indicates a detection signal generation station for detecting, for instance, the absence of one-side original 1 on the original input tray 3 of the ADF 2, the copying side detection of transfer sheets 18, the rotation of the photoconductor drum 12, the size of the transfer sheet 18, the position of the transfer sheet 18 during transportation, and the position of the optical system 14. In the detection signal generation station 500, there are included, for example, the previously mentioned original detection sensor 30 for detecting the absence of one-side original 1 on the original input tray 3 of the ADF 2, the transfer sheet size detectors 31a and 31b, transfer sheet presence or absence detectors 32a and 32b, a transfer sheet registration detector 33, an image fixing detector 34, a transfer sheet output detector 35 and a transfer sheet duplex return detector 36, which are schematically shown in FIG. 1.

Reference numeral 501 indicates an operation station for selecting, for instance, the desired copy mode, for instance, a one-side original - duplex copy mode, and the number of copies to be made from each original.

Reference numeral 502 indicates an auto document feeding station which includes the previously described ADF 2 and other devices for feeding originals to the contact glass 7 and discharging the same to the original output tray 10.

Reference numeral 503 indicates a sequence control station for controlling the duplex copying operation of the electrophotographic according to the present invention.

Specifically, by this sequence control station, the necessary solenoids, clutches and lamps (not shown) for the duplex copying are controlled in accordance with the pulses which are generated, for instance, in accordance with the revolutions of the photoconductor drum 12. Furthermore, the above mentioned operation station 501, the auto document feeding station 502 and a display station 506 which is mentioned below are also controlled by the sequential control station 503.

Reference numeral 504 indicates a power source station from which power is supplied to the solenoids, clutches and lamps.

The above-mentioned display station 506 is for displaying the operation state of the electrophotographic duplex copying machine.

By referring to the circuit diagram shown in FIG. 5, the duplex copying operation according to the present invention will now be explained in detail. The circuits shown in this diagram are incorporated in the above-described sequence control station 503 and serves When a one-side original - duplex copy mode is selected and a front side copying signal is input to an input terminal S of Flip-Flop F1, the Flip-Flop F1 is set, so that the output from an output terminal Q of the Flip-Flop 2 is "1". The Q output "1" is input to a one terminal of Gate G1. Since a one-side original - duplex copy mode is already selected as mentioned above, a duplex mode signal "1" is input to the other input terminal of Gate 1. Therefore, the output of Gate 1 is "1", so that a copy sheet inversion solenoid (not shown) is energized. As a result, the front side copied transfer sheet is inverted by the transfer sheet inversion apparatus 25 (refer to FIG. 1). The Q output "1" from Flip-Flop F1 is also input to one input terminal of Gate 2. When one-side originals 1 are stacked on the original input tray 3 of the ADF 2, the original absence signal "0" is output from the original detection sensor 30 (shown in FIG. 2) and is input to the other input terminal of Gate 2. Since Invertor I₁ is connected to Gate 2, the output from Invertor I₁ is "1". The output "1" from Invertor I₁ is input to one input terminal of Gate 3. Since the output "1" from Gate 1 is also input to the other input terminal of Gate 3, the output from Gate 3 is "1", so that the triple rollers 28 are energized by a solenoid (not shown) and the inverted transfer sheet 18 is transported to the duplex tray 24.

When a preset number of copies have been made from one one-side original 1, a back side copying signal is input to an input terminal R of Flip-Flop F1. As a result, the Flip-Flop F1 is reset, so that the output from an output terminal Q is "1". In the case, since the Q output is "0" and the original absence signal is "0", the output of Gate 1 and the output of Gate 3 are both "0", so that the transfer sheet inversion apparatus 25 and the triple rollers 28 are deenergized. As a result, the transfer sheet 18 is directly discharged onto the copy sheet output tray 27, without being inverted.

Since the Q output "1" of Flip-Flop F1 is input to one input terminal of Gate 4, and the one-side original - duplex copying mode signal "1" is input to the other input terminal of Gate 4, the output of Gate 4 is "1". The output "1" of Gate 4 is input to one input terminal of Gate 7. Further, a sheet feeding timing signal "1" which is generated by the sequence control station 503 is also input to the other input terminal of Gate 7. As a result, a duplex sheet feeding clutch (not shown) is energized and the sheet feeding roller 26 is driven in rotation in synchronization with the sheet feeding timing signal, so that the transfer sheet 18 is carried onto the photoconductor drum 12. Thus, duplex copying is performed on the transfer sheet 18. The duplex copied transfer sheet 18 is then discharged onto the copy sheet output tray 27.

When one-side originals are no more present on the original input tray 3 of the ADF 2 during the front side copying step, since a front side signal is input to the input terminal S of Flip-Flop F1, the Flip-Flop F1 is set, so that the output from the output terminal Q is "1". Since the Q output "1" is input to one terminal of Gate G1 and a one-side original duplex mode signal "1" is input to the other input terminal of Gate 1, the output of Gate 1 is "1", so that the copy sheet inversion solenoid (not shown) is energized. As a result, the front side copied transfer sheet is inverted by the transfer sheet inversion apparatus 25 (refer to FIG. 1).

However, since no one-side original 1 remains on the original input tray 3 of the ADF 2, the original absence signal "1" is output from the original detection sensor 30 and is input to the other input terminal of Gate 2. As a result, the output of Gate 3 is "0", so that the triple rollers 28 remain deenergized. In the end, the transfer sheet 18 is discharged onto the copy sheet output tray 27, without being transported to the duplex tray 24.

Thus, in the present invention, in the one-side original - duplex copy mode, when the last one-side original is an odd-numbered original, the corresponding one-side copied transfer sheet is directly discharged onto the copy sheet output tray 27, with the unnecessary next transfer sheet transportation through the image transfer station and the image fixing station automatically skipped, without counting the total number of one-side originals to be copied before they are copied.

Figure 5:
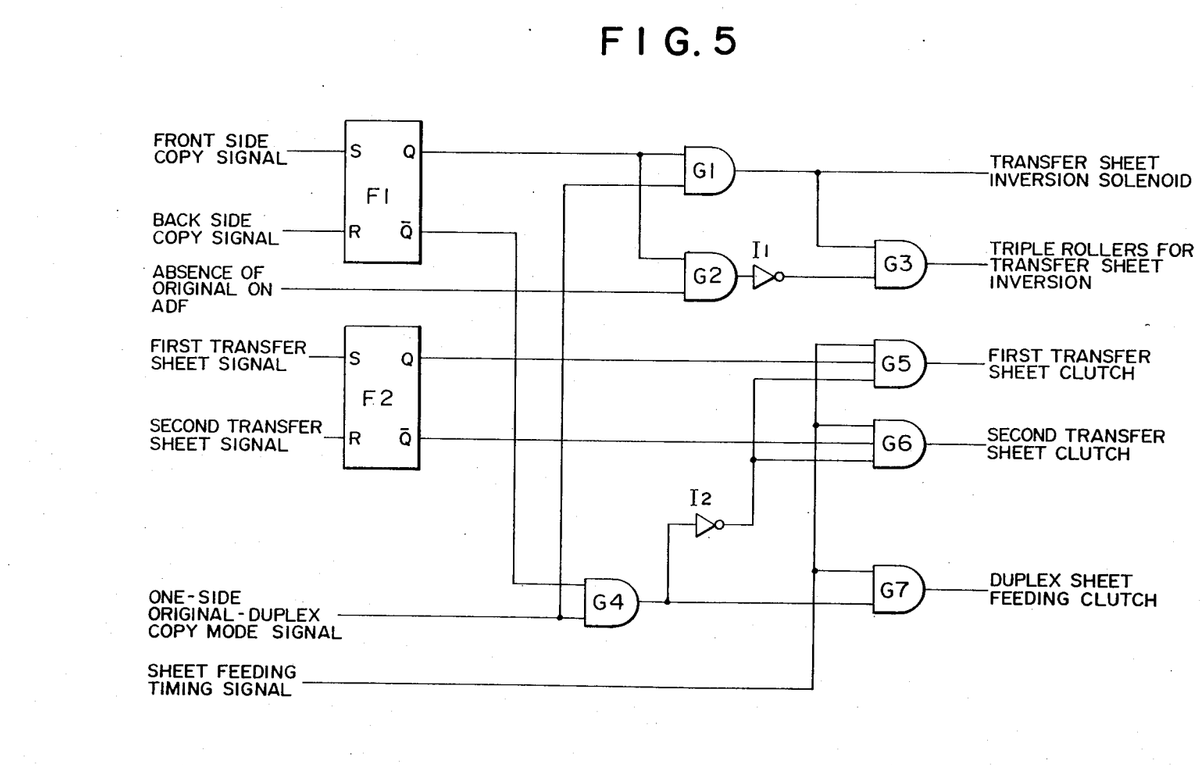
FIG. 5 is a circuit diagram in explanation of the duplex copying operation according to the present invention.

Further, in the circuit diagram shown in FIG. 5, there are shown a Flip-Flop F2 and Gates G4 and G6 for selectively feeding the first size transfer sheet 18a held in the first transfer sheet feeding tray 16 and the second size transfer sheet 18b held in the second transfer sheet feeding tray 17.

Figure 6:
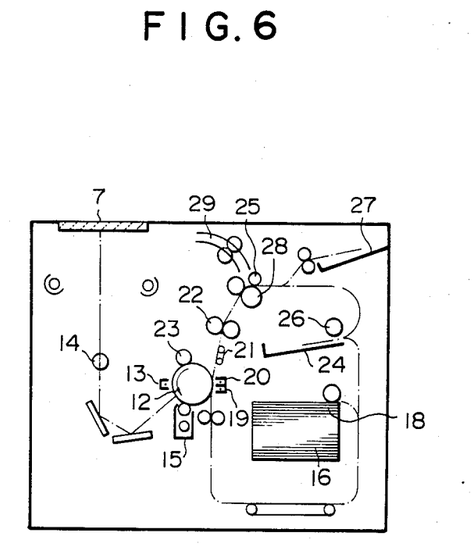
FIG. 6 is a schematic illustration of another electrophotographic duplex copying machine that can be employed in the present invention.

Referring to FIG. 6, there is shown a schematic illustration of another electrophotographic duplex copying machine that can be employed in the present invention. In this figure, the same reference numerals as those employed in FIG. 1 indicate the same or substantially same devices as those in the duplex copying machine shown in FIG. 1. In the duplex copying machine in FIG. 6, when the total number of one-side originals is an even number, the transfer sheets 18, after image transfer, are discharged onto the copy sheet output tray 27, without being inverted during the transportation as shown in the figure by the transfer sheet inversion apparatus 25, unlike the duplex copying machine shown in FIG. 1, so that the transfer sheets 18 are stacked, with each front side down and each back side up, in the order of the pages. However, when the last one-side original is determined to be an odd-numbered original, the transfer sheet 18 is inverted after image transfer by the transfer sheet inversion apparatus 25, so that the transfer sheet 18 is discharged onto the copy sheet output tray 17 with the front side down.

What is claimed is:

1. A duplex copying method of making duplex copies and/or a one-side copy from one-side originals, using an electro-photographic duplex copying machine, capable of forming images on both sides of a transfer sheet when the number of one-side originals is an even number, and forming an image on one side of the last transfer sheet when the number of one-side originals is an odd number by skipping the copying operation on the back side of the last transfer sheet, and of the type including a contact glass, an auto document feeder for individually transporting one-side originals onto said contact glass, an original input tray for stacking thereon said one-side originals, an original discharging means, exposure means, a photoconductive member with an image transfer station, an image fixing station, a transfer sheet feeding means, a duplex copy tray for holding temporarily transfer sheets having an image on one side thereof before they are transferred to said image transfer station for duplex copying, a transfer sheet output means including a transfer sheet output tray, an original detection means capable of detecting the presence or absence of said one-side originals in said auto document feeder, and a copying side detection means for detecting whether copying is performed on a front, odd-numbered side of a transfer sheet or a back, even-numbered side of a transfer sheet during the copying operation, and a change-over means for changing the transporting direction of said transfer sheets directly to said transfer sheet output means or to said duplex copy tray; said method comprising the steps of individually feeding said one-side originals onto said contact glass, forming a latent electrostatic image corresponding to the original image on said photoconductor member, developing said latent electrostatic image to a visible toner image, feeding a transfer sheet to said image transfer station by said transfer sheet feeding means, fixing said toner image to said transfer sheet by said image fixing means, (i) transporting said transfer sheet having an image on one side thereof to said duplex copy tray with said image side up by said change-over means when said original detection means detects the presence of one-side originals in said auto doucment feeder and said copy side detection means detects the front, odd-numbered side copying of said transfer sheet, followed by transporting said transfer sheet having an image on one side thereof to said image transfer station, to said image fixing station and to said transfer sheet output tray, or (ii) transporting said transfer sheet having an image on one side thereof directly to said transfer sheet output tray with said image side down by said change-over means when said original detection means detects the absence of one-side original in said auto document feeder and said copy side detection means detects the front, odd-numbered side copying of said transfer sheet, thereby making duplex copies and stacking them in the order of the pages on said transfer sheet output tray.

2. A duplex copying method of making duplex copies and/or a one-side copy from one-side originals, using an electro-photographic duplex copying machine, capable of forming images on both sides of a transfer sheet when the number of one-side originals is an even number, and forming an image on one side of the last transfer sheet when the number of one-side originals is an odd number by skipping the copying operation on the back side of the last transfer sheet, and of the type including a contact glass, an auto document feeder for individually transporting one-side originals onto said contact glass, an original input tray for stacking thereon said one-side originals, an original discharging means, exposure means, a photoconductive member with an image transfer station, an image fixing station, a transfer sheet feeding means, a duplex copy tray for holding temporarily transfer sheets having an image on one side thereof before they are transferred to said image transfer station for duplex copying, a transfer sheet output means including a transfer sheet output tray, an original detection means capable of detecting the presence or absence of said one-side originals in said auto document feeder, and a copying side detection means for detecting whether copying is performed on a front, odd-numbered side of a transfer sheet or a back, even-numbered side of a transfer sheet during the copying operation, and a change-over means for changing the transporting direction of said transfer sheets directly to said transfer sheet output means or to said duplex copy tray: said method comprising the steps of individually feeding said one-side originals onto said contact glass, forming a latent electrostatic image corresponding to the original image on said photoconductor member, developing said latent electrostatic image to a visible toner image, feeding a transfer sheet to said image transfer station by said transfer sheet feeding means, fixing said toner image to said transfer sheet by said image fixing means, (i) transporting said transfer sheet having an image on one side thereof to said duplex copy tray with said image side down by said change-over means when said original detection means detects the presence of one-side originals in said auto document feeder and said copy side detection means detects the front, odd-numbered side copying of said transfer sheet, followed by transporting said transfer sheet having an image on one side thereof to said image transfer station, to said image fixing station and to said transfer sheet output tray, or (ii) transporting said transfer sheet having an image on one side thereof directly to said transfer sheet output tray with said image side down by said change-over means when said original detection means detects the absence of one-side original in said auto document feeder and said copy side detection means detects the front, odd-numbered side copying of said transfer sheet, thereby making duplex copies and stacking them in the order of the pages on said transfer sheet output tray.

* * * * *